United States Patent [19]

Colgate, Jr.

[11] Patent Number: 4,684,795
[45] Date of Patent: Aug. 4, 1987

[54] SECURITY TAPE WITH INTEGRATED HOLOGRAM AND MAGNETIC STRIP

[75] Inventor: Gilbert Colgate, Jr., New York, N.Y.

[73] Assignee: United States Banknote Company L.P., New York, N.Y.

[21] Appl. No.: 689,339

[22] Filed: Jan. 7, 1985

[51] Int. Cl.⁴ .............................................. G06K 7/10
[52] U.S. Cl. .................................... 235/457; 156/240; 156/272.4; 235/380; 235/449; 235/487; 235/488; 428/916; 283/904; 430/2
[58] Field of Search ............... 235/457, 488, 379, 380, 235/487, 449; 283/86, 904; 430/1, 2, 10; 156/240, 272.4; 428/916

[56] References Cited

U.S. PATENT DOCUMENTS

| 3,552,853 | 1/1971 | Sanders et al. | 283/86 X |
| 4,014,602 | 3/1977 | Ruell | 235/457 X |
| 4,034,211 | 7/1977 | Horst et al. | 235/487 X |
| 4,044,231 | 8/1977 | Beck et al. | 282/904 X |

Primary Examiner—David L. Trafton
Attorney, Agent, or Firm—Cushman, Darby & Cushman

[57] ABSTRACT

An identification card and method of manufacturing the same in which a holographic image is embossed on a clear polyester carrier which is then coated with ferrous oxide to form a magnetic strip with an optically viewable holographic image thereon. The strip is then mounted on a plastic substrate, and the carrier discarded.

14 Claims, 2 Drawing Figures

SECURITY TAPE WITH INTEGRATED HOLOGRAM AND MAGNETIC STRIP

BACKGROUND AND SUMMARY OF THE INVENTION

The invention relates to security tape for mounting on a plastic information bearing substrate, a document or other element.

Credit cards are considered by most people in the United States to be an essential of modern life. Typically, information is printed and embossed on a plastic substrate identifying the holder of card and the issuer. A magnetic strip contains similar information and is mounted on one side, normally the rear side, for storing the information magnetically. Inevitably, increased counterfeiting of such cards has accompanied the increase in their use. This has in turn lead to great interest in incorporating into each individual card measures making counterfeiting as difficult as possible.

One technique now being adopted is to provide on each credit card a small difraction grating forming an image which appears to be three dimensional at least in the horizontal direction. Such a difraction grating is more commonly known as a hologram and is manufactured by interferring coherent laser light reflected from or transmitted through an object with light transmitted directly from the laser and serving as a reference. Such a hologram when reconstructed with coherent light from the same or a similar laser provides an image which appears to have three dimensions, i.e. appears to have depth. Of course, lasers are not normally available at locations such as restaurants and shops where credit cards must be inspected. However, through the use of conventional techniques a difraction grating of this sort can be made which is viewable in natural light, i.e. a so called white light viewable hologram.

Credit cards are now being issued incorporating such a white light viewable hologram on the front surface of the card. Such a hologram is relatively difficult to manufacture and requires fairly complex equipment. Therefore, the average counterfeiter is discouraged if not entirely prevented from attempting to counterfeit such a card. Moreover, the authenticity of the white light viewable hologram and hence the card can be readily ascertained by any unskilled person even under poor light simply by viewing the hologram and observing whether it has the illusion of depth and changing colors which are the characteristics of a white light viewable hologram. While providing satisfactory protection or at least discouragement of counterfeiting this arrangement has several drawbacks.

First, the space available on the front of the card is very limited. Most issuers of such cards want to use all of the space for imparting that commercial information and for identifying themselves and the issuer of the card. If the hologram is made too small it may be difficult for the clerk or other person accepting the card to see whether the hologram is truly there and whether it is simulated. Discarded cards, even if cut in two, may still have a full hologram which can be transferred to a counterfeit card for fraudulent use.

According to the present invention, an optically viewable hologram is formed on the magnetic strip which is normally mounted on the rear of the card for storing information about the card magnetically. This reserves the entirety of the front of the card for use by the issuer for whatever purpose he may desire. The hologram on the magnetic strip is relatively large in area and is very easy to identify as such. In addition, placing the hologram on the rear of the magnetic strip encourages the clerk or other person accepting the card to turn over the card and check the signature panel. This is rarely done at the present time.

According to the method of the present invention, a white light viewable hologram is first cast, for example as taught in application Ser. No. 505,888 filed June 20, 1983. More specifically, a hologram is formed on one side of a carrier of clear plastic. The hologram may be embossed on a metallized carrier or cast on clear plastic and made visible by deposit of a non-magnetic metal or application of a non-magnetic ink. The hologram is then coated with ferrous oxide to form a magnetic strip with an optically viewable image thereon. The magnetic strip can then be mounted onto a plastic substrate and the carrier removed to form the card of the present invention. If desired miniscule clear glass beads or other light scattering compounds can be provided between the layer of clear material and the ferrous oxide to provide the possibility of yet another authentication of the card as well as making the holographic image more impervious to counterfeiting through reconstruction by laser techniques.

Other objects and purposes of the invention will be clear from the following detailed description of the drawings.

DETAILED DESCRIPTION OF THE DRAWINGS

Figure 1:
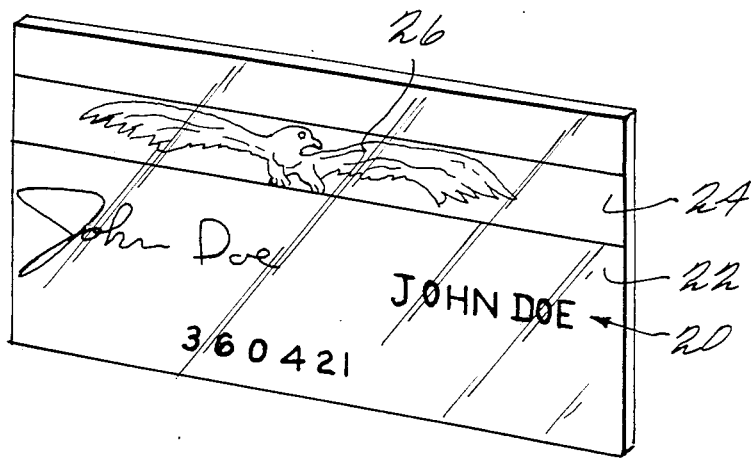
FIG. 1 shows a perspective view of the rear side of a credit card according to the present invention with an optically viewable hologram disposed on the magnetic strip.
Figure 2:
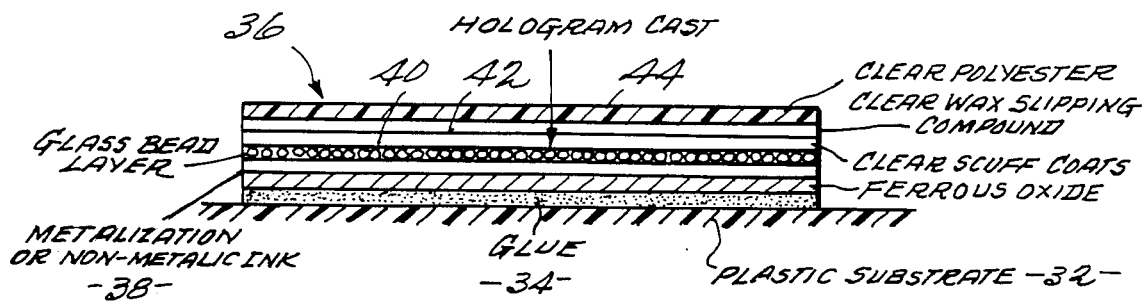
FIG. 2 shows a schematic view of the hologram of the present invention showing the layers and components forming the cast hologram and magnetic layer.

Reference is now made to FIGS. 1 and 2 which illustrate a first embodiment of the present invention. In this embodiment a conventional credit card 20 is formed with a plastic substrate 22 and a magnetic strip of 24 bearing a white light viewable hologram 26.

The hologram is formed according to the present invention as noted above in the co-pending application which is incorporated herein. More particularly, the hologram is formed on a clear plastic carrier, for example a one-half to one mil clear polyester to the bottom of which has been coated a release coating of a clear wax slipping compound of the type commercially available. Any number of coatings of a clear scuff may be provided on the clear wax slipping compound. Such scuff coats are relatively hard and are conventionally used with magnetic tape to protect the strip after fixation. A variety of suitable coats are available.

The carrier can be metallized and then embossed or the image can be cast in the carrier and made visible by metallizing or applying non-metallic ink.

If cast, the hologram is coated in a vacuum metalizer with a metal such as aluminum or printed with a non-metallic ink to make the hologram visible. The metallic material or ink used must be non-magnetic. The design and direction of the image can be as desired.

The metallized layer is now preferably treated to facilitate adhesion of the ferrous oxide, for example with methylethyl ketone. A slurry of high-density ferrous oxide is next applied to the hologram by a gravure coater in the same fashion is now used to produce magnetic strips for cards. The ferrous oxide is generally combined with an adhesive which fixes the oxide particles when dry and upon later application of heat (in the hot stamping process) provides the "glue" by which the magnetic tape permanantly adheres to the back of the card.

A coating of glass beads can be provided beneath the hologram. Such beads typically are less than 5 μm in diameter and are made so that when hit by light of certain radiation the resultant radiation can be read and measured as a further test of the validity of the card. These beads can be incorporated into a clear lacquer and coated on the bottom of the holographic image.

Such light scattering beads, compounds or chemicals additionally serve the purpose of protecting the diffraction grating from reconstruction (i.e. counterfeiting by laser for holographic) technology. The assembly is fixed to the card by hot stamping. Application of heat and pressure activates the glue while the release layer separates from the polyester. The polyester can then be removed and discarded.

Referring to FIG. 2, magnetic strip 30 is shown adhered to conventional plastic substrate 32. The strip includes a layer of glue 34, ferrous oxide layer 36 storing the magnetic information, the above noted layer of glass beads 38, respective layers of scuff coats and clear wax slipping compounds 40 and 42 and the clear polyester layer 44.

Many changes and modifications in the above described embodiment of the invention can, of course, be carried out without departing from the scope thereof. While the invention finds particular utility as a security measure on credit cards, the tape can be used on any document or the like where magnetic storage is desired. Accordingly, that scope is intended to be limited only by the scope of the appended claims.

What is claimed is:

1. An identification card comprising:
   a plastic substrate having information embossed thereon and
   a magnetic strip mounted on one side of said card for storing information magnetically, said magnetic strip having an optically viewable holographic image thereon.

2. A card as in claim 1 wherein said image is embossed on said strip.

3. A card as in claim 1 wherein said strip includes a non-magnetic layer with a holographic image and a layer of ferrous oxide storing said information magnetically between said non-magnetic layer and said plastic substrate.

4. A card as in claim 3 further including a layer of glass beads between said one side of said non-magnetic layer and said ferrous oxide layer.

5. A card as in claim 3 further including a layer of a clear wax slipping compound and a clear scuff coat with said non-magnetic layer being between said slipping compound and said ferrous oxide layer.

6. A card as in claim 3 further including a layer of glue mounting said strip on said substrate.

7. A method of manufacturing an identification card comprising the steps of:
   forming a hologram on one side of a carrier;
   coating said one side with ferrous oxide to form a magnetic strip with an optically viewable holographic image thereon and
   mounting said magnetic strip on a plastic substrate having information embossed thereon.

8. A method as in claim 7 further including the step of placing a layer of glass beads or light scattering compounds between said carrier and said ferrous oxide.

9. A method as in claim 7 including the step of applying glue to said ferrous oxide to mount said strip on said substrate.

10. A method as in claim 9 wherein said step of mounting including appying heat and pressure to said strip so that said carrier separates from the strip and the strip adheres to said substrates.

11. A method as in claim 7 wherein said step of forming includes embossing said hologram onto a layer of metallized polyester.

12. A method as in claim 7 including the further step of removing said carrier.

13. A method as in claim 7 wherein said step of forming includes casting said hologram onto a layer of clear polyester and laying down non-metallic ink on the embossed hologram.

14. A security tape comprising a magnetic strip for storing information magnetically and having an optically viewable holographic image thereon.

* * * * *